(12) United States Patent
Matsugi et al.

(10) Patent No.: US 7,441,588 B2
(45) Date of Patent: Oct. 28, 2008

(54) HEAT EXCHANGER UNIT

(75) Inventors: Yoshitaka Matsugi, Sakai (JP); Akira Fujimoto, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 581 days.

(21) Appl. No.: 10/512,679

(22) PCT Filed: Jan. 19, 2004

(86) PCT No.: PCT/JP2004/000380

§ 371 (c)(1),
(2), (4) Date: Oct. 27, 2004

(87) PCT Pub. No.: WO2004/065859

PCT Pub. Date: Aug. 5, 2004

(65) Prior Publication Data

US 2005/0167077 A1 Aug. 4, 2005

(30) Foreign Application Priority Data

Jan. 23, 2003 (JP) ............................. 2003-014216

(51) Int. Cl.
*F24F 7/08* (2006.01)
*F24F 7/007* (2006.01)

(52) U.S. Cl. .......................... 165/54; 165/95; 165/119; 165/909; 454/232; 454/233; 454/234

(58) Field of Classification Search .................. 165/54, 165/909, 95, 119; 454/232, 233, 234
See application file for complete search history.

(56) References Cited

FOREIGN PATENT DOCUMENTS

| CN | 2344696 Y | | 10/1999 |
|---|---|---|---|
| CN | 2248959 Y | | 9/2001 |
| GB | 2134648 A | * | 8/1984 |
| JP | 3-134428 A | | 6/1991 |
| JP | 05106883 A | * | 4/1993 |
| JP | 05223307 A | * | 8/1993 |
| JP | 07332727 A | * | 12/1995 |
| JP | 08178333 A | * | 7/1996 |
| JP | 10-213383 A | | 8/1998 |
| JP | 2000-051331 A | | 2/2000 |
| JP | 2000-130720 A | | 5/2000 |
| JP | 2002022233 A | * | 1/2002 |

(Continued)

*Primary Examiner*—John K Ford
(74) *Attorney, Agent, or Firm*—Global IP Counselors

(57) ABSTRACT

The present invention provides a heat exchanger unit that can save space, even when performing air conditioning in addition to ventilation. The heat exchanger unit performs heat exchange ventilation with a supply air channel flowing from an outdoor space to an indoor space and an exhaust air channel flowing from the indoor space to the outdoor space and includes an optical deodorization portion and a first blowing portion. The optical deodorization portion is provided so as to be linked to at least the indoor space and performs air conditioning with a circulation channel. The circulation channel is provided in the vicinity of either the supply air channel or the exhaust air channel. The first blowing portion includes a double-suction first impeller having a first suction inlet and a second suction inlet. Here, one of the supply air channel and the exhaust air channel that is provided in the vicinity of the circulation channel is provided at the first suction inlet side of the first impeller. The circulation channel is provided at the second suction inlet side of the first impeller.

9 Claims, 8 Drawing Sheets

FOREIGN PATENT DOCUMENTS

| | | | |
|---|---|---|---|
| JP | 2002071185 A * | 3/2002 | |
| JP | 2002-206778 A | 7/2002 | |
| JP | 2003-021375 A | 1/2003 | |
| JP | 2003-148781 A | 5/2003 | |

* cited by examiner

HEAT EXCHANGER UNIT

TECHNICAL FIELD

The present invention relates to a heat exchanger unit, in particular a heat exchanger unit that performs heat exchange ventilation with a supply air channel flowing from an outdoor space to an indoor space and an exhaust air channel flowing from the indoor space to the outdoor space.

BACKGROUND ART

In office buildings and the like, ventilation is occasionally carried out by drawing fresh outside air into a room, in order to make the indoor space more comfortable. However, when a room that has been air-conditioned by a cooler/heater or the like is ventilated by opening windows, the heat of the air-conditioned air will escape. Then, it will be necessary to again operate the air conditioning device, such as the cooler/heater, for controlling the temperature in the indoor space, resulting in a waste of energy.

For this reason, as a method for performing ventilation of a room while maintaining the above-described air-conditioned state to be as good as possible, heat exchange is performed between a supply air (outside air) supplied into the room and air-conditioned air (return air) discharged from the room. This method also reduces the waste of energy resulting from operating air conditioning devices.

As an apparatus for performing heat exchange ventilation by the above-described method, a heat exchanger unit is known. The heat exchanger unit is operated either in association with an air conditioning device such as an air conditioner or independently, and is installed for ventilating buildings and other various facilities. This heat exchanger unit is installed, for example, in the ceiling of an indoor space SI that is to be ventilated, as shown in FIG. 7. The heat exchanger unit shown here is operated in association with an air conditioning device 82. In a heat exchanger unit 80 as shown in FIG. 7, a heat exchange element 81 carries out heat exchange between return air H1 from the indoor space SI and outside air G1 from an outdoor space SO, using a supply air channel G and an exhaust air channel H, and the return air H1 is released into the outdoor space SO (exhaust steam H2) and the outside air G1 that has been heat-exchanged is sent out into the indoor space SI as supply air G2 (see e.g., Japanese Patent Unexamined Publication JP2000-130720A).

In recent years, increasing attention has been paid to indoor environments, and there is a growing demand for an overall comfortable indoor environment, including factors such as air purity, humidity and content of harmful substances in the air. Therefore, it has been attempted to achieve a more comfortable indoor environment not only by performing ventilation with the above-described heat exchanger unit, but also by providing multiple air conditioning devices, for example, by separately arranging an air conditioning device such as a deodorization unit and a humidification unit, and operating their functions simultaneously.

When providing an additional air conditioning device as described above, however, it is necessary to reserve an additional space to install that air conditioning device. This becomes a more significant problem when air conditioning is performed with various functions by providing a larger number of air conditioning devices.

SUMMARY OF THE INVENTION

It is an object of the present invention to provide a heat exchanger unit that can save space even when performing air conditioning in addition to ventilation.

According to a first aspect of the present invention, a heat exchanger unit that performs heat exchange ventilation with a supply air channel flowing from an outdoor space to an indoor space and an exhaust air channel flowing from the indoor space to the outdoor space, and is provided with a first supplementary function portion and a first blowing portion. The first supplementary function portion performs air conditioning with a first supplementary function channel disposed so as to be linked to at least the indoor space. This first supplementary function channel is provided in the vicinity of either the supply air channel or the exhaust air channel. The first blowing portion includes a double-suction first impeller having a first suction inlet and a second suction inlet. Here, one of the supply air channel and the exhaust air channel that is provided in the vicinity of the first supplementary function channel is provided at the first suction inlet side of the first impeller. The first supplementary function channel is provided at the second suction inlet side of the first impeller, which is axially opposite to the first suction inlet side.

In the heat exchanger unit, the air of the indoor space and the air of the outdoor space are replaced with each other while performing heat exchange between them, thus performing the ventilation of the indoor space. Here, it may be desirable to achieve an even more improved indoor environment by performing air conditioning by providing further air conditioning equipment, in addition to performing heat exchange ventilation with the heat exchanger unit. When installing further air conditioning equipment separately, however, it is necessary to reserve an additional space to install that equipment.

In the heat exchanger unit of the first aspect of the present invention, however, the first blowing portion includes a double-suction first impeller having a first suction inlet and a second suction inlet. Accordingly, it is possible by a single first impeller to include two channels, a channel for air sucked from the first suction inlet side and a channel for air sucked from the second suction inlet side. Then, either the supply air channel or the exhaust air channel that is provided in the vicinity of the first supplementary function channel is provided at the first suction inlet side of the first impeller, and the first supplementary function channel is provided at the second suction inlet side of the first impeller. Therefore, the two channels reserved by the first impeller can be used for the supply air channel and the first supplementary function channel provided in the vicinity of the supply air channel. Similarly, the two channels can be used for the exhaust air channel and the first supplementary function channel provided in the vicinity of the exhaust air channel.

Accordingly, although the heat exchanger unit is provided with an additional channel for performing air conditioning with the first supplementary function portion, in addition to performing heat exchange ventilation with two channels, it is possible with a single first impeller to produce airflows in two channels, either the supply air channel or the exhaust air channel that is provided in the vicinity of the first supplementary function channel and the first supplementary function channel, without the need to provide an additional fan separately.

Therefore, the heat exchanger unit can save space even though it is provided with the first supplementary portion.

Here, the first supplementary function portion may perform air conditioning either with a first supplementary function channel linked to the indoor space and the outdoor space, or with a first supplementary function channel that starts from the indoor space and returns again to the indoor space.

According to a second aspect of the present invention, the heat exchanger unit of the first aspect of the present invention is preferably configured such that the first blowing portion further includes a first casing that houses the first impeller. Here, the interior of the first casing is divided into a first space and a second space. The first space is a space at the first suction inlet side of the first impeller. The second space is a space at the second suction inlet side of the first impeller, which is axially opposite to the first suction inlet side.

Although two channels, the channel at the first suction inlet side and the channel at the second suction inlet side, are reserved by a single first impeller here, the air passing through the above-described two channels may occasionally be mixed together.

In the heat exchanger unit of the second aspect of the present invention, however, the interior of the first casing is divided into the first space and the second space. Accordingly, it is possible with a single first blowing portion to suppress the mixing of the air sucked from the first space side and the air sucked from the second space side. Therefore, even when the air passing through the first space side of the first impeller and the air passing through the second space side differ from each other in conditions, properties and the like, it is possible to achieve effective air conditioning in which the mixing of the two airflows is suppressed, while performing heat exchange ventilation.

According to a third aspect of the present invention, the heat exchanger unit of the second aspect of the present invention is preferably configured such that the first impeller includes a first impeller side-partition member. This first impeller side-partition member is disposed so as to separate air sucked from both the first space and the second space in the interior of the double-suction first impeller. The first casing includes a first casing side-partition member. This first casing side-partition member is formed extending from an inner circumference of the first casing to a vicinity of an outer circumference of the first impeller side-partition member, thereby dividing the interior of the first casing into the first space and the second space. This first casing side-partition member and the first impeller side-partition member are made of hard materials such as synthetic resin or metal, capable of suppressing the ventilation between the above-described two spaces.

Here, the interior of the first casing, including the interior of the first impeller in the first blowing portion, is divided into the first space and the second space by cooperation of two partition members, namely the first impeller side-partition member and the first casing side-partition member, instead of by a single partition member. Accordingly, the two spaces can be divided, for example, by altering the shapes of portions of the first impeller side-partition member and the first casing side-partition member that are in close proximity with one another. For example, it is possible to employ a structure in which the edge of one partition member is depressed and the edge of the other partition member is housed in that depression. Therefore, it is possible to prevent the mixing of the two airflows more effectively.

According to a fourth aspect of the present invention, the heat exchanger unit of the third aspect of the present invention is preferably configured such that the first impeller side-partition member and the first casing side-partition member can be moved freely in the direction of a rotation shaft of the first impeller to any position.

Here, since the first impeller side-partition member and the first casing side-partition member can be set in any positions with respect to the direction of the rotation shaft, it is possible to vary the volumes of air in the two spaces in the first blowing portion. Accordingly, at the time of setting the volume of air in the first supplementary function portion, it is possible to increase the degree of flexibility in that setting.

For example, when the first impeller side-partition member and the first casing side-partition member are provided at positions closer to the first space with respect to the direction of the rotation shaft, the channel at that first space side becomes narrower than the channel at the second space side; accordingly, it is possible to decrease the flow rate flowing through the first space side and increase the flow rate flowing through the second space side.

According to a fifth aspect of the present invention, the heat exchanger unit of anyone of the first to fourth aspects of the present invention is preferably configured such that the first impeller includes a pair of annular members and a plurality of blades disposed on a circumference so as to join the two annular members together.

Here, the first impeller is made up of a pair of annular members and a plurality of blades disposed on a circumference so as to join the two annular members together, and air sucked from the openings of the pair of the annular members is blown radially outward from the plurality of the blades disposed on a circumference by rotating this first impeller.

The plurality of the blades disposed on a circumference may be provided either perpendicular to, or obliquely to the pair of the annular members.

According to a sixth aspect of the present invention, the heat exchanger unit of anyone of the first to fifth aspects of the present invention is preferably configured such that the first supplementary function channel is a channel that draws air of the indoor space and returns the air into the indoor space after performing air conditioning.

Here, with the first supplementary function portion provided in this first supplementary function channel, the air drawn from within a room can be air-conditioned and returned into the room again. Therefore, it is possible to improve an indoor environment by performing another kind of air conditioning in addition to ventilation, thus realizing a better indoor environment.

For example, when a humidification portion that draws humidity of the outdoor space into the indoor space is adopted as the first supplementary function portion, humidified air whose temperature is not controlled is brought into the temperature-controlled indoor space. Accordingly, it is difficult to maintain the indoor space at a desired temperature, even though a desired humidity can be achieved. However, it is possible even in such a case to reduce the heat loss of the air of the indoor space that is cooled or heated, since the channel used here returns the air of the indoor space into the indoor space after performing air conditioning.

According to a seventh aspect of the present invention, the heat exchanger unit of anyone of the first to sixth aspects of the present invention is preferably configured such that the first supplementary function portion includes at least one selected from a deodorization portion (element) that reduces odorous components in passing air to reduce odorous components in the indoor space, an air purification portion (element) that reduces harmful components in passing air to reduce harmful components in the indoor space and a humidification portion (element) that increases moisture in passing air to increase moisture in the indoor space. Thus, the deodorization portion (element), the air purification portion (element) and the humidification portion (element) can be considered air conditioning elements, at least one of which being disposed in at least one of a first (inlet) air channel connecting the indoor space to the first suction inlet side of the double-suction first impeller and a second (outlet) air channel guiding air flow from the double-suction first impeller to the indoor space.

Here, it is possible to perform additional air conditioning by using at least one of the deodorization portion, the air purification portion and the humidification portion that is provided in the first supplementary function channel, while performing heat exchange ventilation with the heat exchanger unit. Therefore, it is possible to make the indoor space more comfortable.

The first supplementary function channel used here may be provided with two or more functions, including, for example, a combination of the deodorization portion and the air purification portion, or the deodorization portion and the humidification portion.

In the deodorization portion that reduces odorous components, it is possible to perform deodorization with, for example, a deodorizing photocatalyst. In this case, it is possible to suppress a reduction in the decomposition performance by utilizing the properties of the deodorizing photocatalyst. For this reason, a high deodorization performance can be maintained for a relatively long period of time, as compared with other deodorization methods such as ozone deodorization and activated carbon deodorization. Accordingly, it is possible to reduce the time and effort for, or the number of times of, the maintenance of the deodorizing catalyst.

According to an eighth aspect of the present invention, the heat exchanger unit of anyone of the first to seventh aspects of the present invention is preferably configured to further include a second blowing portion. This second blowing portion includes a second impeller sharing a rotation shaft with the first impeller.

In order to perform ventilation by heat exchange, two channels, a supply air channel and an exhaust air channel, are required, and a blowing portion equipped with an impeller and a driving portion such as a motor for rotating that impeller are required for each of the supply air channel and the exhaust air channel. Accordingly, it is necessary to provide two such motors or driving portions.

In the heat exchanger unit of the eighth aspect of the present invention, however, the first impeller and the second impeller share the same rotation shaft, so that it is possible by a single driving portion to rotate these two impellers by using one common motor or driving portion for rotating these impellers. This permits a reduction in the number of parts.

In addition, this also allows a further reduction in size of the heat exchanger unit.

According to a ninth aspect of the present invention, the heat exchanger unit of the eighth aspect of the present invention is preferably configured such that the second impeller is of the double-suction type, having a first suction inlet and a second suction inlet, and further includes a second supplementary function portion. The second supplementary function portion performs air conditioning with a second supplementary function channel. This second supplementary function channel is linked to at least the indoor space and provided either at the first suction inlet side of the second impeller or at the second suction inlet side of the second impeller, which is axially opposite to the first suction inlet side.

Similarly to the first impeller, the second impeller of the second blowing portion here is of double-suction type and includes a first suction inlet and a second suction inlet. Therefore, it is possible with a single second impeller to produce airflows in two channels, a channel for the air sucked from the first suction inlet side and a channel for the air sucked from the second suction inlet side. This allows two channels to be provided also in the second blowing portion, and one of these two channels can be used as the second supplementary function channel for performing air conditioning with the second supplementary function portion. That is, when including the above-described first impeller, a total of four channels can be reserved for a single heat exchanger unit here. Accordingly, it is possible with these four channels to achieve additional air conditioning with the second supplementary function portion, in addition to performing heat exchange ventilation and air conditioning with the first supplementary function portion, thus making the indoor environment even more comfortable.

Here, the second supplementary function portion may perform air conditioning either with a second supplementary function channel linked to the indoor space and the outdoor space, or with a second supplementary function channel that starts from the indoor space and returns back to the indoor space.

According to a tenth aspect of the present invention, the heat exchanger unit of the ninth aspect of the present invention is preferably configured such that the second blowing portion further includes a second casing that houses the second impeller. Here, the interior of the second casing is divided into a third space and a fourth space. The third space is the space at the first suction inlet side of the second impeller. The fourth space is the space at the second suction inlet side of the second impeller, which is axially opposite to the first suction inlet side.

Here, although the two channels, the channel at the first suction inlet side and the channel at the second suction inlet side, are reserved with a single second impeller, the airs passing through the above-described two channels may occasionally be mixed together.

In the heat exchanger unit of the tenth aspect of the present invention, however, the interior of the second casing is divided into the third space and the fourth space. Accordingly, it is possible to suppress the mixing of the air sucked from the third space side and the air sucked from the fourth space side in a single second blowing portion. It is therefore possible to achieve effective air conditioning in which the mixing of the two airflows is suppressed, while performing heat exchange ventilation, even when the air passing through the third space side of the second impeller and the air passing though the fourth space side differ from each other in condition, properties and the like.

According to an eleventh aspect of the present invention, the heat exchanger unit that performs heat exchange ventilation with a supply air channel flowing from an outdoor space to an indoor space and an exhaust air channel flowing from the indoor space to the outdoor space, and includes a supply air blowing portion and a supplementary function portion. The supply air blowing portion draws air of the outdoor space into the supply air channel and sends out the air into the indoor space. The supplementary function portion performs another air conditioning different from the heat exchange ventilation, using the supply air blowing portion.

In the heat exchanger unit, the air of the indoor space and the air of the outdoor space are replaced with each other, while performing heat exchange between them, thus performing the ventilation of the indoor space. Here, it may be desirable to achieve an even more improved indoor environment by performing air conditioning by providing further air conditioning equipment, in addition to performing heat exchange ventilation with the heat exchanger unit. When installing further air conditioning equipment separately, however, it is necessary to reserve an additional space to install that equipment.

In the heat exchanger unit of the eleventh aspect of the present invention, however, the supplementary function portion performs another kind of air conditioning different from the heat exchange ventilation, using an air flow produced with the supply air blowing portion. Therefore, even though the heat exchange unit performs a different kind of air conditioning with the supplementary function portion, it is possible to use an airflow produced by the supply air blowing portion and to achieve air conditioning with the supplementary function portion without separately providing an airflow for the supplementary function portion. Accordingly, the heat exchange unit can save space even when performing additional air conditioning with the supplementary function, in addition to heat exchange ventilation.

Examples of the different air conditioning with the supplementary function portion here include the removal of dirt and dust, cooling, heating, dehumidification, humidification, the removal of bacteria and viruses, deodorization and aromatization. The air conditioning with the supplementary function portion may be performed either on the air that has not been heat-exchanged, or on the heat-exchanged air.

According to a twelfth aspect of the present invention, the heat exchanger unit of the second aspect of the present invention is preferably configured such that the supply air blowing portion includes a double-suction impeller.

Here, the supply air blowing portion includes a double-suction impeller, and two airflows are produced with a single impeller. Accordingly, air supply can be performed using one airflow produced with the supply air blowing portion, and the air conditioning with the supplementary function portion can be performed using the other airflow. Therefore, even though the heat exchanger unit performs additional air conditioning with a supplementary function portion, in addition to heat exchange ventilation, it is possible with a single impeller to perform the two functions of air supply and the air conditioning with the supplementary function portion without the need to provide any additional blowing device separately.

Here, the air conditioning with the supplementary function portion may be performed using the airflow at one suction inlet side of the double-suction impeller, and air supply may be performed using the airflow at the other suction inlet side, for example. It is also possible, for example, to adopt a configuration that allows still another different air conditioning to be performed, using the airflow at the air supply side here.

PREFFERED EMBODIMENTS OF THE INVENTION

First Embodiment

General Configuration of the Heat Exchanger Unit

Figure 1:
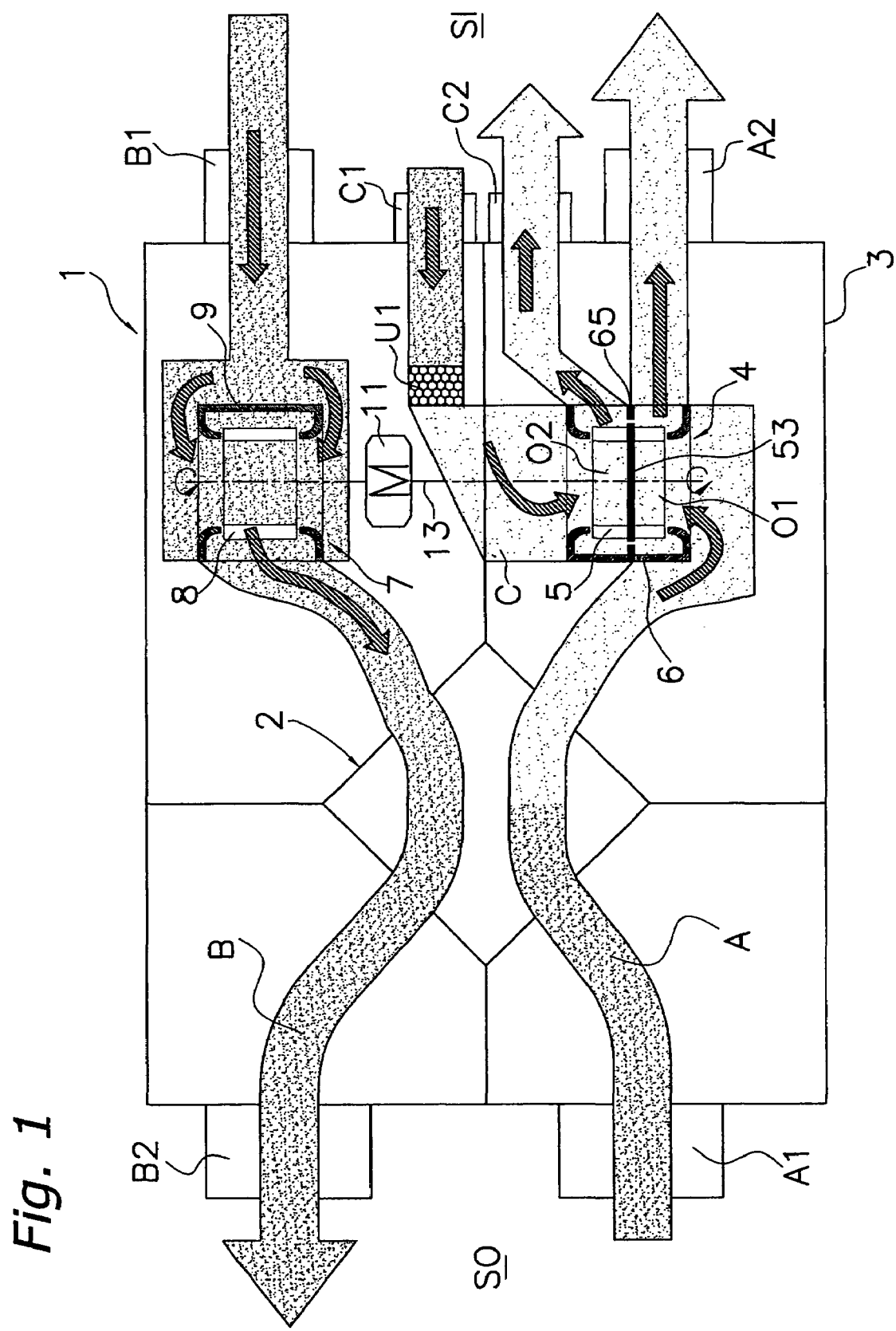
FIG. 1 is a conceptual diagram showing a configuration of a heat exchanger unit.

A heat exchanger unit 1 according to a first embodiment of the present invention is shown in FIG. 1. FIG. 1 is a conceptual diagram of the heat exchanger unit 1, and for a better understanding of the concept, channels are shown as ducts. However, it is also possible to form the channels by providing a partition plate in each portion, instead of by providing such ducts.

This heat exchanger unit 1 is installed in the ceiling or the like of an indoor space SI to be ventilated. The heat exchanger unit 1 includes a heat exchanger casing 3, a supply air channel A, an exhaust air channel B, a first blowing portion 4, a second blowing portion 7, a heat exchange element 2, a circulation channel C, an optical deodorization portion U1 and a fan motor 11.

The heat exchanger casing 3 is provided with a supply air suction inlet A1 and a supply air discharge outlet A2 serving as openings linking the outdoor space SO with the indoor space SI, and an exhaust air suction inlet B1 and an exhaust air discharge outlet B2, which are similar openings. The heat exchanger casing 3 is also provided with a circulation suction inlet C1 and a circulation discharge outlet C2 for forming a circulation channel C that will be described later. The indoor space SI is ventilated with the supply air channel A for sending out, from the supply air discharge outlet A2, the outside air sucked from the supply air suction inlet A1, and the exhaust air channel B for sending out, from the exhaust air discharge outlet B2, the outside air drawn from the exhaust air suction inlet B1.

Figure 3:
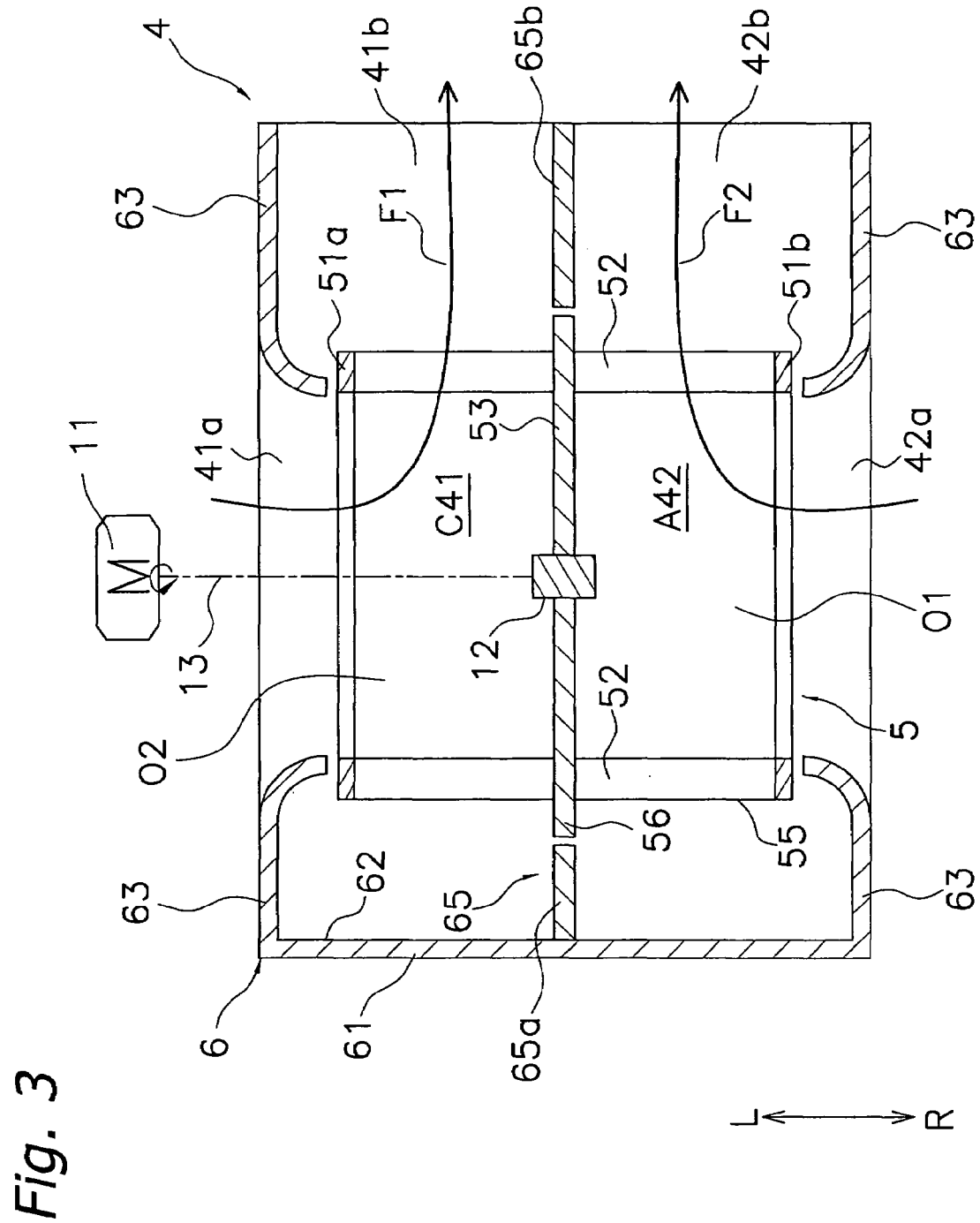
FIG. 3 is a cross-sectional front view of a first blowing portion.

The first blowing portion 4 is disposed so as to extend across both the supply air channel A and the circulation channel C, and produces the above-described airflows in the supply air channel A and the circulation channel C. This first blowing portion 4 is made up of, for example, a first impeller 5, a first casing 6, a first impeller side-partition plate 53 and a first casing side-partition plate 65. As shown in FIG. 3, the first impeller 5 is a fan (a so-called sirocco fan) constituted by a pair of parallel annular plates 51a and a plurality of blades 52 disposed along the circumferences of the annular plates 51a so as to join these annular plates 51a together, and it is operated such that the outside air flows in from the supply air suction inlet A1 and the air of the indoor space SI flows in from the circulation suction inlet C1. The first casing 6 is formed so as to guide a current of air generated through the operation of the first impeller 5 in a desired direction. The first blowing portion 4 is also provided with a first impeller side-partition plate 53 and a first casing side-partition plate 65. This results in the formation of two channels. As shown in FIG. 3, a right channel A42 (described later), which is the channel flowing through a space O1 on one side, is used for the supply air channel A, and a left channel C41 (described later), which is the channel flowing through a space O2 on the other side, is used for the circulation channel C.

The fan motor 11 is a motor that simultaneously rotates two fans, namely the first impeller 5 and the second impeller 8. Both of these fans are disposed on the same rotation shaft 13.

The second blowing portion 7 is disposed in the exhaust air channel B, and produces an exhaust airflow as described above. The second blowing portion 7 is made up of, for example, a second impeller 8 and a second casing 9. The second impeller 8 is a sirocco fan that is similar to the first impeller, except for not being provided with any partition plate, and it is provided in the exhaust air channel B and operated such that the air (return air) of the indoor space SI, which is to be ventilated, flows in from the exhaust air suction inlet B1. The second casing 9 is formed so as to guide a current of air generated through the operation of the first impeller 5 in a desired direction.

The heat exchange element 2 has a configuration that allows heat exchange to be performed between the air of the supply air channel A and the air of the exhaust air channel B without mixing the air together. Here, heat exchange is performed between the return air passing from the indoor space SI through the exhaust air channel B and the outside air passing from the outdoor space SO through the supply air channel A. Then, the return air is released into the outdoor space (exhaust air), and the outside air that has been heat-exchanged is sent out into the indoor space SI as supply air.

The circulation channel C serves as a channel for returning the indoor air drawn from the circulation suction inlet C1 into the indoor space SI from the circulation discharge outlet C2. The circulation channel C is provided with an optical deodorization portion U1 having an optical deodorization filter, an inverter lamp and the like. With this optical deodorization filter, the optical deodorization portion U1 reduces odors contained in the air drawn from within a room, and then returns the air to the indoor space SI again.

Configuration of the Heat Exchange Element

The heat exchange element 2 is of a so-called total heat exchange type, handling both sensible heat and latent heat, and has a configuration in which the supply air channel A and the exhaust air channel B that are orthogonal to each other are laminated alternately. The air of the outdoor space SO is heat-exchanged to a temperature close to room temperature by the heat exchange element 2 disposed at an intermediate portion of the supply air channel A, and flows into the indoor space SI. Conversely, the air of the indoor space SI is heat-exchanged by the heat exchange element 2 that is disposed at an intermediate portion of the exhaust air channel B so as to intersect the supply air channel A, and is released into the outdoor space SO.

Ventilation Operation

In the above-described heat exchanger unit 1, the indoor space SI and the outdoor space SO outside a building are linked by the supply air channel A and the exhaust air channel B. Then, the first impeller 5 and the second impeller 8 are rotated by operating the fan motor 11, starting the operation of the heat exchanger unit 1.

Figure 2:
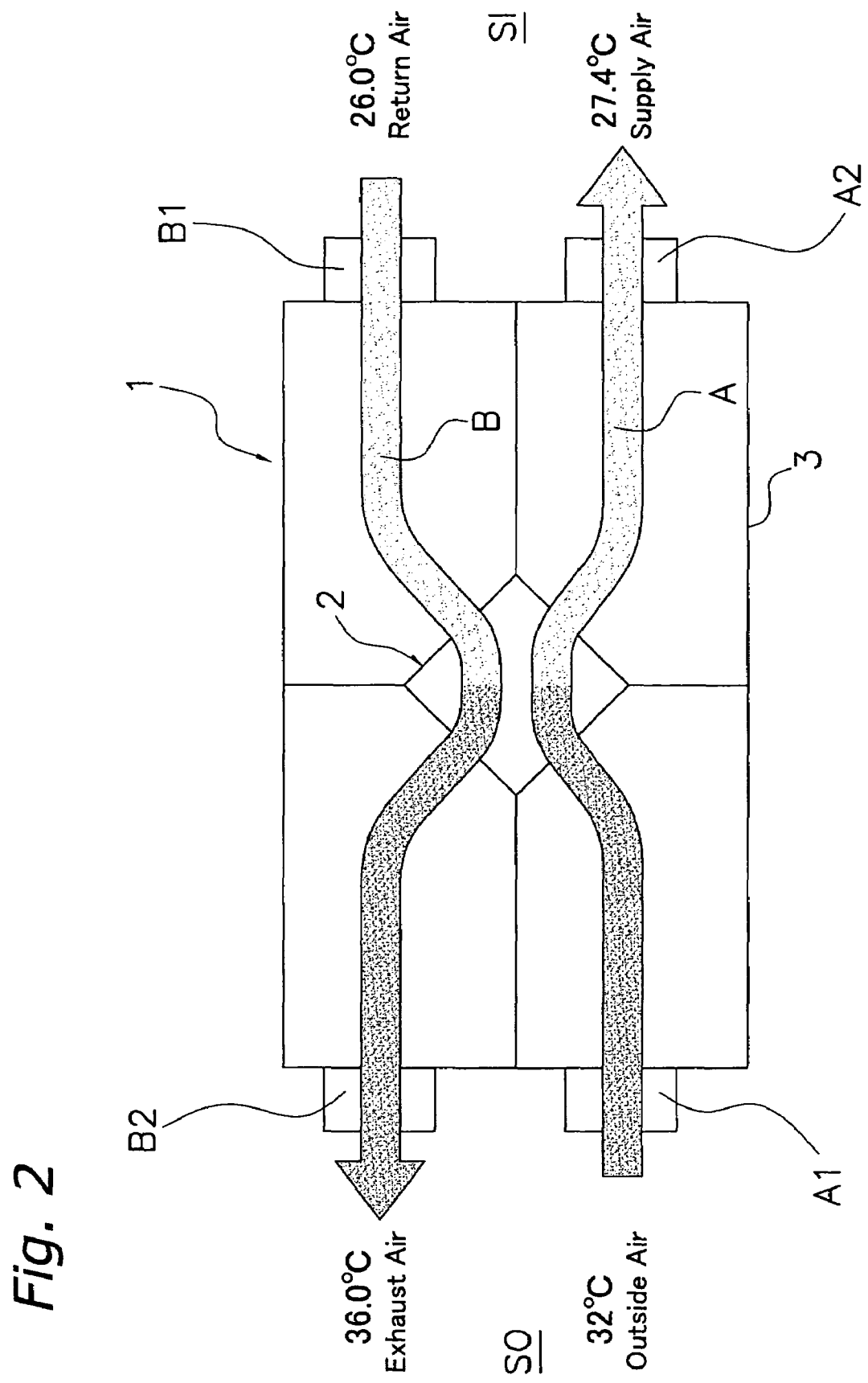
FIG. 2 is a diagram showing a heat exchange operation with the heat exchanger unit.

The operation of this heat exchanger unit 1 varies depending on the circumstances, such as cooling in summer, heating in winter, cooling when the temperature of the outdoor space SO is lower than that of the indoor space SI and heating when the temperature of the outdoor space SO is higher than that of the indoor space SI. An example of the operation is described below with reference to FIG. 2.

When the indoor space SI is cooled at 26° C. with an air conditioning device (not shown) in summer, the heat exchanger unit 1 draws return air at 26° C. from the exhaust air suction inlet B1 into the exhaust air channel B, while drawing outside air at 32° C. from the supply air suction inlet A1 into the supply air channel A, and performs heat exchange by the heat exchange element 2. In this case, supply air at 27.4° C. is sent into the indoor space SI from the supply air discharge outlet A2, while at the same time exhaust air at 30.6° C. is released into the atmosphere from the exhaust air discharge outlet B2. This reduces the operating load of the air conditioning device for controlling the temperature, thus reducing energy consumption.

General Configuration of the Optical Deodorization Portion

An optical deodorization portion U1 of the circulating type is installed in the circulation channel C, as shown in FIG. 1. The optical deodorization portion U1 is made up of, for example, an optical deodorization filter and an inverter lamp, and draws the air of the indoor space SI from the circulation suction inlet C1 and returns the air into the indoor space SI from the circulation discharge outlet C2 after reducing odorous components in the air. The optical deodorization filter is a filter that reduces the odors in the air sucked from the indoor space SI, and it includes a deodorizing photocatalyst and performs deodorization through an optical deodorization operation that will be described later.

As shown in FIG. 3, which is a cross-sectional view of the first blowing portion 4, airflow F1 of the circulation channel C is produced by the portion of the first impeller 5 that is located in the left channel C41 in the above-described first blowing portion 4. Here, the air is impelled such that the air of the circulation channel C for optical deodorization and the air of the supply air channel A for heat exchange ventilation will not be mixed together.

Optical Deodorization Operation

Here, the deodorization operation with the optical deodorization filter, the inverter lamp, and the like, that are provided in the optical deodorization portion U1 is described.

The deodorization operation described here utilizes the properties of the photocatalyst of being able to render harmful constituents harmless, when exposed to ultraviolet rays. Examples of such a photocatalyst currently used include titanium oxide, which produces active oxygen (hydroxy radical, super oxide anion) upon receiving the energy of ultraviolet rays and decomposes organic matters or inorganic matters by the action of that active oxygen. The oxidative decomposition by the active oxygen is very strong, and decomposes malodorous components, harmful substances and the like into carbonic acid gas and water. It can also inactivate bacteria, viruses and the like and remove them as a mass of protein. The light irradiation to the photocatalyst for producing such active oxygen is performed with an inverter lamp. That is, bacteria, odorous components and the like in the air are decomposed by irradiating the photocatalyst with light including ultraviolet rays and the like that is emitted from the inverter lamp. Thereafter, the air is blown into the indoor space SI through the left channel C41 of the first blowing portion 4, as indicated by the arrow F1 in FIG. 3.

General Configuration of the First Blowing Portion

Figure 4:
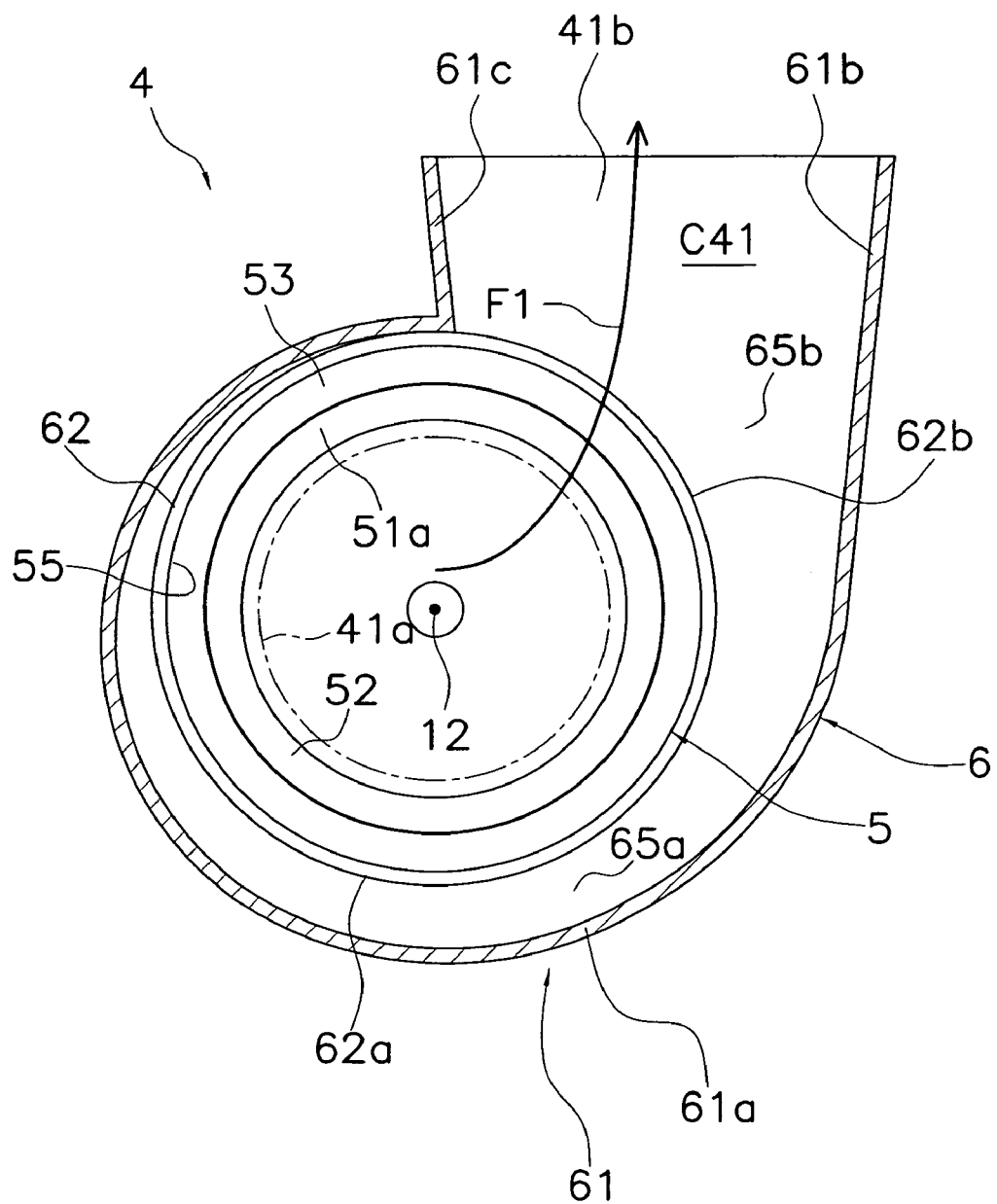
FIG. 4 is a cross-sectional side view of the first blowing portion.

Here, the first blowing portion 4 is described with reference to FIGS. 3 and 4. FIG. 3 is a cross-sectional front view schematically showing the first blowing portion 4 and a fan motor 11 that drives the first blowing portion 4. FIG. 4 is a cross-sectional side view corresponding to the first blowing portion 4 of FIG. 3. The first blowing portion 4, together with a fan motor 11, constitutes a centrifugal air blower, and includes the first impeller 5 that is rotatably supported and the first casing 6 that houses the first impeller 5. The first impeller 5 is driven by being connected to the rotation shaft 13 of the fan motor 11 aligned in its axial direction.

In the following explanations, the axial direction, in which the rotation shaft of the first impeller 5 extends, is taken as the longitudinal direction (with the directions indicated by the arrowheads L and R of FIG. 3 respectively taken as the left and the right).

The first casing 6 includes a substantially cylindrical peripheral wall 61 and a pair of side walls 63 that are connected with the peripheral wall 61 at both axial ends of the peripheral wall 61. As shown in FIG. 4, the peripheral wall 61 includes a circumferential surface portion 61a having a substantially arc cross-section, a longer plane portion 61b extending tangentially from one circumferential end of the circumferential surface portion 61a and a shorter plane portion 61c facing the longer plane portion 61b and extending from the other circumferential end of the circumferential surface portion 61a.

The first impeller 5 has a substantially cylindrical shape and is provided such that the axis of this cylindrical shape coincides with the rotation shaft 13. As shown in FIG. 3, the first impeller 5 is an impeller that sucks air from both its left and right sides, in which a pair of substantially parallel annular plates 51a and 51b are connected to a circular first impeller side-partition plate 53 that longitudinally divides the space between the annular plates 51a and 51b, by a plurality of blades 52 arranged in a circle. At the center of each of the annular plates 51a and 51b, an opening for passing air is provided. The first impeller side-partition plate 53 is provided substantially in the middle in axial direction. At the center of the first impeller side-partition plate 53, a boss portion 12 into which the rotation shaft 13 for rotational driving is fitted is formed. A large number of the blades 52 are provided on a circumference about the rotation shaft 13. The blades 52 are shaped identically to one another, for example, in Sirocco type.

Between the outer circumference 55 of the above-described first impeller 5 and an inner circumference 62 of the first casing 6, the first casing 6 includes a first casing side-partition plate 65 that divides the interior of the first casing 6 axially longitudinally in cooperation with the first impeller side-partition plate 53. Since the interior of the first casing 6 is divided into a space O2 at the left side and a space O1 at the right side in this manner, it is possible to allow two airflows, F1 and F2, to pass through while suppressing the mixing of these two airflows. Therefore, even though the heat exchange unit 1 includes the supplementary function portion U1 and thus is additionally provided with the circulation channel C that performs air conditioning, it is possible to suppress the mixing of the air flowing through the supply air channel A and the air flowing through this circulation channel C. Accordingly, while it is usually necessary to provide a fan separately when including the supplementary function portion U1 in the heat exchanger unit 1, only a single blowing portion is needed to produce two airflows that are prevented from mixing together as described above, if this configuration of the first blowing portion 4 is adopted. This can eliminate the above-described need to install a fan separately, thus reducing the size of the heat exchanger unit.

In the first casing 6, a left suction inlet 41a, a left discharge outlet 41b and a left channel C41 are disposed in the space O2 at the left side, and a right suction inlet 42a, a right discharge outlet 42b and a right channel A42 are disposed in the space O1 at the right side. The left suction inlet 41a and the right suction inlet 42a are formed in the above-described pair of the annular plates 51a and 51b, respectively. The left discharge outlet 41b and the right discharge outlet 42b are formed so as to be linked with the left suction inlet 41a and the right suction inlet 42a, respectively. The left channel C41 links the left suction inlet 41a and the left discharge outlet 41b, and the right channel A42 links the right suction inlet 42a and the right discharge outlet 42b. The left channel C41 and the right channel A42 are separated from each other by cooperation of the first impeller side-partition plate 53 and the first casing side-partition plate 65. The left suction inlet 41a and the right suction inlet 42a face the annular plates 51a and 51b of the first impeller 5, respectively, and form bell mouths that lead air to the openings of the annular plates 51a and 51b. The left discharge outlet 41b and the right discharge outlet 42b are disposed axially adjacent to one another, and are divided by the pair of side walls 63, the pair of plane portions 61b and 61c and a discharge outlet side-partition plate 65b included in the first casing side-partition plate 65. The discharge directions from the left discharge outlet 41b and the right discharge outlet 42b are provided parallel to one another and with the same orientation.

The first casing side-partition plate 65 includes an annular projection 65a and a discharge outlet side-partition plate 65b.

The annular projection 65a is disposed in the inner circumference 62 of the first casing 6 and extends towards the center of rotation into close proximity to an outer circumferential edge 56 of the first impeller side-partition plate 53 of the first impeller 5. The discharge outlet side-partition plate 65b connects the longer plane portion 61b with the shorter plane portion 61c, and is linked with the annular projection 65a in the first casing 6.

The discharge outlet side-partition plate 65b, the annular projection 65a and the first impeller side-partition plate 53 are made of materials capable of preventing air from passing through them, including, for example, hard materials such as synthetic resin and metal. The discharge outlet side-partition plate 65b is a plate that divides the portion in the vicinity of the discharge outlet of the first casing 6 that is provided with a frame-like shape by the peripheral wall 61 and the side walls 63, into the left discharge outlet 41b and the right discharge outlet 42b. A discharge outlet side-inner circumference 62b of the discharge outlet side-partition plate 65b is in close proximity with the outer circumferential edge 56 of the first impeller side-partition plate 53 of the first impeller 5, and has the shape of an arc along the outer circumferential edge 56.

The annular projection 65a extends so as to project radially inward from the peripheral wall 61 of the first casing 6, and an annular projection-inner circumference 62a that is the front end of the projection forms an arc shape. The annular projection 65a and the discharge outlet side-partition plate 65b are disposed in almost the same position in the direction of an axis, and are smoothly linked together in the vicinity of the outer circumferential edge 56 of the first impeller side-partition plate 53. This allows the annular projection 65a and the discharge outlet side-partition plate 65b to cooperate to divide the interior of the first casing 6. The inner circumference 62 of the peripheral wall 61 of the first casing 6 includes the annular projection-inner circumference 62a of the annular projection 65a and the discharge outlet side-inner circumference 62b of the discharge outlet side-partition plate 65b. The inner circumference 62 of the first casing 6 has a substantially circular shape in its cross-section perpendicular to the axial direction. This circular shape has a predetermined diameter centering on the rotation shaft 13 of the first impeller 5 and is in close proximity with the outer circumferential edge 56 of the first impeller side-partition plate 53.

The first impeller side-partition plate 53 is a disc concentric to the rotation shaft 13, and is formed so as to project radially outward beyond the blades 52 by a predetermined length. The outer circumferential edge 56 of the first impeller side-partition plate 53 is in close proximity with the annular projection-inner circumference 62a of the annular projection 65a included in the first casing side-partition plate 65 and the discharge outlet side-inner circumference 62b of the discharge outlet side-partition plate 65b.

The first blowing portion 4 is divided by the first impeller side-partition plate 53, the annular projection 65a and the discharge outlet side-partition plate 65b, which are disposed in almost the same position in the direction of an axis such that their edges face each other. The gap between the outer circumferential edge 56 of the first impeller side-partition plate 53 on the one hand and the annular projection-inner circumference 62a of the annular projection 65a and the discharge outlet side-inner circumference 62b of the discharge outlet side-partition plate 65b on the other hand extends axially. The fan motor 11 is driven in a predetermined direction, for example, in a counter-clockwise direction. As a result, the first impeller 5 and the first impeller side-partition plate 53 rotate in the same direction.

Regarding the Two Air Channels

When the fan motor 11 is driven to rotate the first impeller 5, the blades 52 pushes the air present inside the first blowing portion 4 to the outside of the first blowing portion 4. Accordingly, air is drawn from the respective openings provided in the pair of the annular plates 51a and 51b.

The air of the indoor space SI is drawn from the opening of the annular plate 51a. This air has passed through the circulation channel C after being sucked from the circulation suction inlet C1, and its odors have been reduced with the optical deodorization portion U1 provided in the circulation channel C. As indicated by the arrow F1 in FIG. 3, this air with reduced odors passes through the left suction inlet 41a of the first blowing portion 4 and then through the opening of the annular plate 51a, and is blown out, after passing through the left channel C41, from the left discharge outlet 41b into the indoor space SI.

At the same time, the air of the outdoor space SO is drawn from the opening of the annular plate 51b. This air has been heat-exchanged by the heat exchange element 2 in the supply air channel A, after being sucked from the supply air suction inlet A1. As indicated by the arrow F2 in FIG. 3, this heat-exchanged air passes through the right suction inlet 42a of the first blowing portion 4 and then through the opening of the annular plate 51b, and is blown out, after passing through the right channel A42, from the right discharge outlet 42b into the indoor space SI.

At this time, it is possible to suppress the mixing of the airflows F1 and F2 respectively flowing through the channel C41 and A42.

It should be noted that the first impeller side-partition plate 53 and the first casing side-partition plate 65 can be each provided in any position in the axial direction. Accordingly, it is possible to increase the flow rate of the air passing through the circulation channel C, or conversely, to increase the flow rate of the air passing through the supply air channel A. Here, for example, air is supplied at 250 m3/h in the supply air channel A and the exhaust air channel B that are passed through the heat exchange elements 2, and the indoor air is circulated at 350 m3/h in the circulation channel C for optical deodorization in order to maintain a constant deodorizing efficiency. The volume of air is regulated by changing the static pressure by adjusting the size of the gaps for preventing leakage that are provided between the first impeller 5 and the first casing 6.

Features of the Heat Exchanger Unit According to the First Embodiment of the Present Invention

[1]

In this embodiment, even though the heat exchanger unit 1 includes the optical deodorization portion U1 and thus is provided with the supply air channel A for heat exchange ventilation and a single circulation channel C for optical deodorization, it is possible to suppress the mixing of the air passing through these channels.

Moreover, while it is usually necessary to provide a fan separately when including the optical deodorization portion U1 in the heat exchanger unit 1, such a need to install a fan separately can be eliminated by adopting a configuration in which the interior of the first blowing portion 4 is divided into two spaces. Therefore, even when additionally providing another supplementary function, the heat exchanger unit 1 can be prevented from increasing in size or can be made compact. It is also possible to suppress an increase in the number of parts, thus achieving a simplified configuration.

[2]

In this embodiment, odorous components in the indoor air are reduced not only through ventilation alone, but also through deodorization using the optical deodorization portion U1. Therefore, it is possible to reduce the volume of the air to be ventilated in order to decrease the odorous components below a certain level. This enables a further reduction in the indoor heat loss resulting from cooling or heating.

The indoor odorous component can be more efficiently reduced, when the odorous components are reduced not only by performing ventilation alone, but also by using the deodorization portion U1. That is, the heat exchanger unit 1 of the above-described embodiment, which is additionally provided with a supplementary air conditioning function such as the optical deodorization portion U1, is effective especially in a situation where it is difficult to improve the indoor environment only by air exhaustion (for example, where numerous odorous components and viruses are present in the indoor air) or in a situation where it is difficult to prevent the degradation of the indoor environment only by air exhaustion.

[3]

Here, the first impeller side-partition plate 53 and the first casing side-partition plate 65 can be provided at any positions with respect to the direction of the rotation shaft 13. This allows free adjustment of the flow rate flowing through the left channel C41 at the left side of the first blowing portion 4 and the flow rate flowing through the right channel A41 at the right side. Therefore, it is possible to achieve an air volume according to users requests, and also to adjust the air volume according to the function of the optical deodorization portion U1.

[4]

In this embodiment, since the decomposition of the odorous components in the indoor air is carried out using the photocatalyst at the optical deodorization portion U1, the decomposition performance tends not to deteriorate. For this reason, a high deodorization performance can be maintained for a relatively long period of time, as compared with other deodorization methods such as ozone deodorization and activated carbon deodorization. Accordingly, it is possible to reduce the time and effort for, or the number of times of, the maintenance of the deodorizing catalyst.

[5]

In this embodiment, the air that is returned into the indoor space SI after passing through the circulation channel C passes through the left channel C41 of the first blowing portion 4 through which the air that has been subjected to heat exchange ventilation passes. Even if heat is exchanged to some extent over the first impeller side-partition plate 53 and the first casing-side-partition plate 65, the air that has gained or lost heat is sent out into the indoor space SI without escaping into the outdoor space SO. Therefore, the indoor temperature change can be suppressed better in the present embodiment than when the first blowing portion 4 is provided at a portion through which the air that has not been heat-exchanged passes and the air is passed through the circulation channel C at that portion.

[6]

This embodiment is configured such that the first blowing portion 4, the second blowing portion 7 and the fan motor 11 share the same rotation shaft 13. Accordingly, it is possible by a single fan motor 11 to rotate the two blowing portions, the first blowing portion 4 and the second blowing portion 7. Therefore, it is possible to suppress an increase in the number of parts without the need to provide a driving portion separately for each blowing portion, thus achieving a simplified configuration. It is also possible to achieve a compact heat exchanger unit 1.

Modifications of the Heat Exchanger Unit According to the First Embodiment of the Present Invention

[A]

In the above-described embodiment, the circulation channel C is provided with the optical deodorization portion U1, and odors in the indoor air are reduced with the photocatalyst. However, the circulation channel C may alternatively be provided with a humidification portion including a moisture absorbing-desorbing agent for absorbing and desorbing moisture, and the indoor air may be humidified with this humidification portion. In this case, the indoor space can be made comfortable both in terms of ventilation and humidification.

Alternatively, the circulation channel C may be provided with an air purification portion that reduces harmful constituents contained in the indoor air, and the indoor air may be purified with this air purification portion. In this case, the indoor space can be made comfortable both in terms of ventilation and air purification.

[B]

Figure 5:
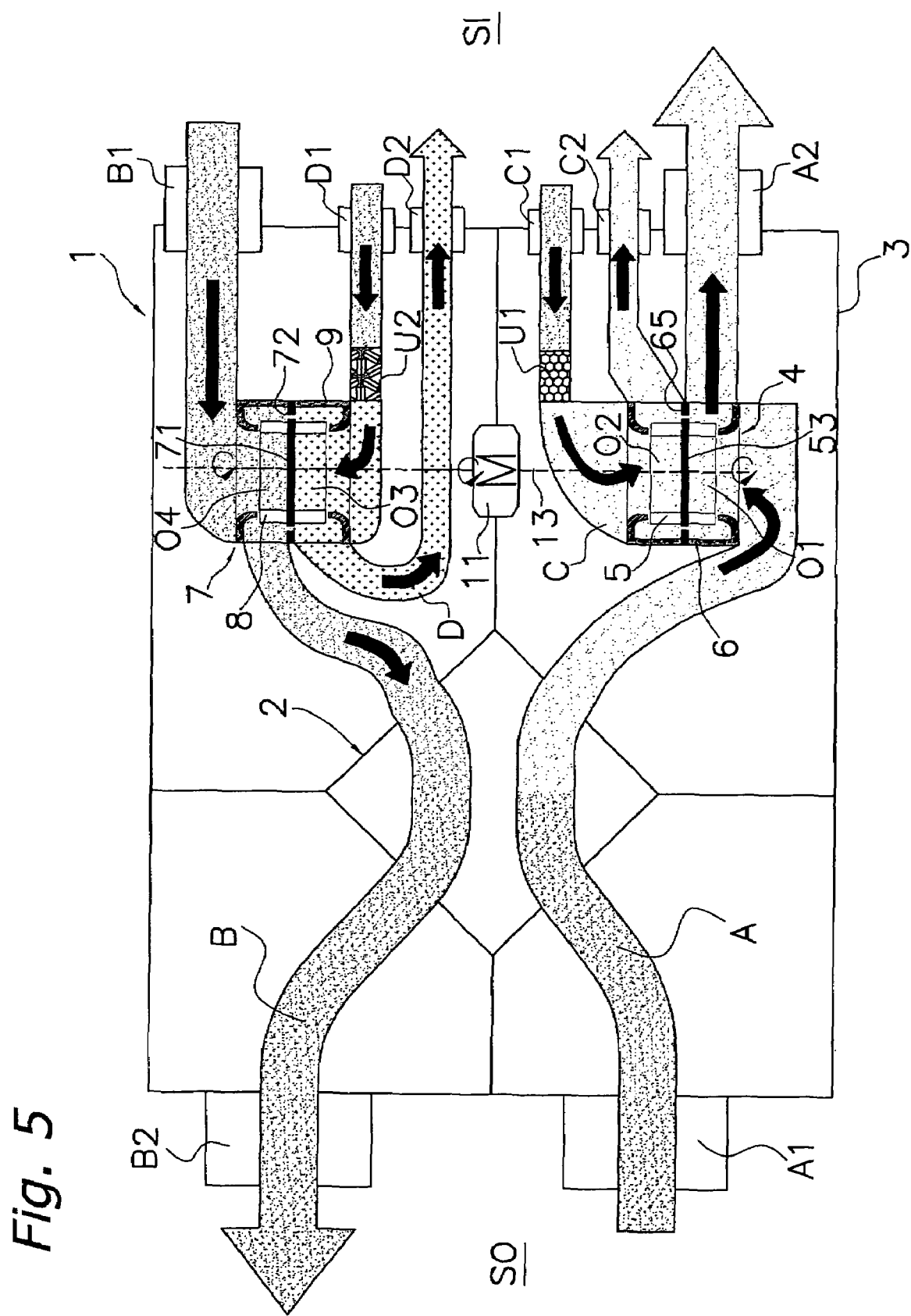
FIG. 5 is a conceptual diagram showing a modification of a configuration of the heat exchanger unit.

In the above-described embodiment, only the first blowing portion 4 includes the first impeller side-partition plate 53 of the first impeller 5 and the first casing side-partition plate 65 of the first casing 6. However, as shown in FIG. 5, the second impeller 8 may be provided with a second impeller side-partition plate 71 and the second casing 9 may be provided with a second casing side-partition plate 72 also in the second blowing portion 7. By dividing the interior of the second blowing portion 7 into a third space O3, which is one space in the direction of the rotation shaft, and a fourth space O4, which is the opposite space, it is possible to form an additional circulation channel D and to provide this additional circulation channel D with an optical deodorization portion U2. In this modification, this circulation channel D forms an air flow channel by a circulation suction inlet D1 that draws the air from the indoor space SI and a circulation channel D2 that returns the air that has been air-conditioned with a different supplementary function portion U2 into the indoor space SI.

Thus, even though the heat exchanger unit 1 is further provided with the circulation channel C and the circulation channel D in this way, in addition to two channels that perform heat exchange ventilation, it is possible to employ the first blowing portion 4 and the second blowing portion 7 that can blow streams of air while suppressing the mixing of them. Accordingly, the first blowing portion 4 can suppress the mixing of the air flowing through one of the supply air channel A and the exhaust air channel B in which heat exchange ventilation is performed and the air flowing through the circulation channel C being located in the vicinity of that one channel and in which air conditioning is performed. The second blowing portion 7 can suppress the mixing of the air flowing through the other of the supply air channel A and the exhaust air channel B in which heat exchange ventilation is performed, the air flowing through the circulation channel C being located in the vicinity of that other channel and in which air conditioning is performed. Moreover, while it is usually necessary to provide an air-blowing fan separately for operating a supplementary function portion when additionally providing the heat exchanger unit 1 with a supplementary function, such a need to install a fan can be eliminated by adopting a blowing portion as described above that can blow two streams of air while suppressing the mixing of them. Accordingly, the heat exchanger unit can also be made compact even when it is additionally provided with two supplementary functions, similarly to when it is additionally provided with a single supplementary function.

As shown in FIG. 5, other supplementary functions, such as the humidification portion and the air purification portion, in the above-described modification (A) can also be selectably added to the above-described circulation channel C and circulation channel D. For example, it is possible to arrange the optical deodorization portion as the supplementary portion U1 in the circulation channel C and the humidification portion as the supplementary portion U2 in the circulation channel D. This enables multiple functions of air conditioning, such as ventilation, deodorization and humidification, to be performed simultaneously. Therefore, it is possible to achieve a more comfortable indoor environment.

FIG. 5 is a conceptual diagram of the modification of the heat exchanger unit 1, and for a better understanding of the concept, channels are shown as ducts. However, it is also possible to form the channels by providing a partition plate in each portion, instead of by providing such ducts.

[C]

Figure 6:
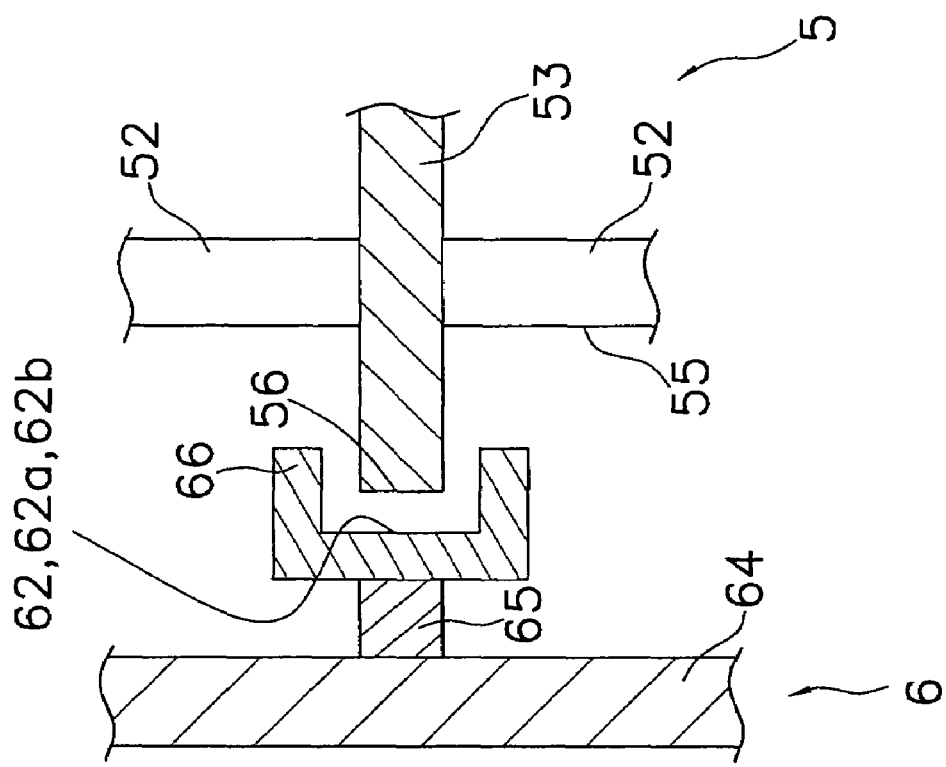
FIG. 6 is an enlarged view of two partition plates.
Figure 7:
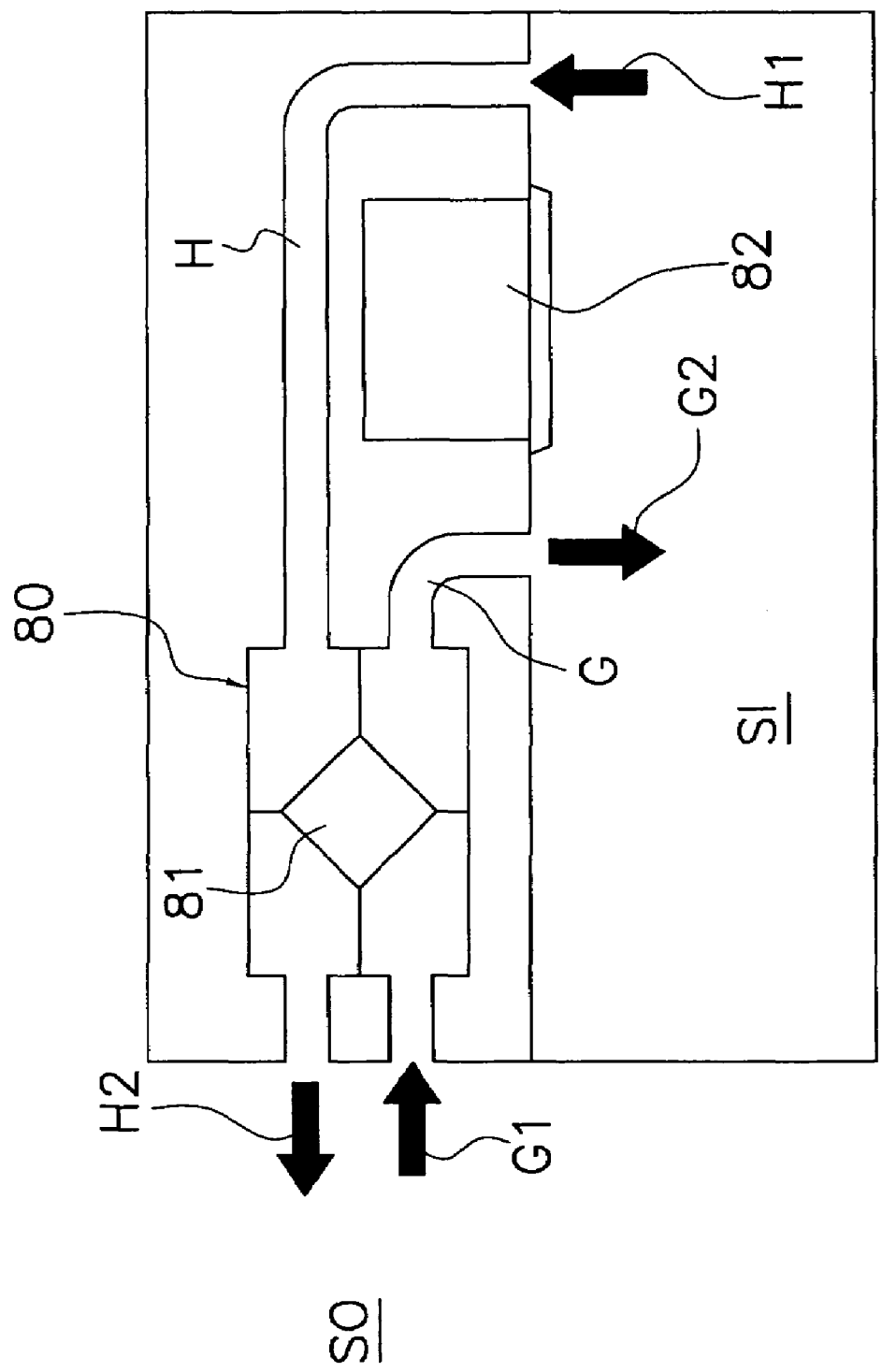
FIG. 7 is a diagram showing a general layout of the heat exchanger unit.

In the above-described embodiment, the first impeller side-partition plate 53 and the first casing side-partition plate 65 are provided such that the edges of the partition plates are in close proximity with each other. However, as shown in FIG. 6, it is possible to dispose a groove-shaped member 66 on the first casing side-partition plate 65 so as to surround the outer circumferential edge 56 of the first impeller side-partition plate 53. This results in a zigzag-shaped gap extending axially and radially between the outer circumferential edge 56 of the first impeller side-partition plate 53 and this groove-shaped member 66, giving a configuration that suppresses passage of air. Accordingly, it is possible to prevent air from traveling between the left channel C41 and the right channel A42 more effectively.

The same effect as described above can also be achieved by disposing this groove-shaped member on the first impeller side-partition plate 53 side.

Furthermore, the same effect as described above can also be achieved by disposing this groove-shaped member on the second impeller side-partition plate 71 or on the second casing side-partition plate 72 in the above-described modification (B).

[D]

In the above-described embodiment, the first blowing portion 4 is provided at a position through which the heat-exchanged air passes in the supply air channel A. However, it may be provided at a position through which air that has not been heat-exchanged passes through in the supply air channel A. The second blowing portion 7 may be provided at a position through which the heat-exchanged air passes in the exhaust air channel B.

[E]

In the above-described embodiment, the circulation discharge outlet C2 and the supply air discharge outlet A2 are separated from each other by the discharge outlet side-partition plate 65b. However, the circulation discharge outlet C2 and the supply air discharge outlet A2 do not have to be separated. This is because the air discharged from these outlets will be mixed in the indoor space SI as the air entering the indoor space SI in either case, thus achieving the same effect as that of the above-described embodiment.

[F]

In the above-described embodiment, the first impeller 5 and the second impeller 8 are configured such that they are simultaneously rotated about the same shaft by the fan motor 11. Here, the first impeller 5 and the second impeller 8 may also be configured such that they have different capacities, for example, by varying the number of teeth of the gears used for these impellers such that they have different numbers of revolution per unit time.

On the other hand, instead of controlling the operation of the rotation of the two impellers by a single fan motor 11 as in the above-described embodiment, the impellers may be separately controlled by two fan motors, for example, by separately providing a fan motor for rotating the first impeller 5 and a fan motor for rotating the second impeller 8. By permitting separate and independent on-off control of each impeller in this manner, it is possible to perform, for example, only air exhaustion, or only air supply and the circulation of the indoor air. In this case, even when air exhaustion is not performed, it is possible to draw fresh, purified air into the room by performing only air supply and circulation of the indoor air.

In, for example, a configuration in which the first blowing portion 4 is provided in the supply air channel A and the second blowing portion 7 is provided so as to extend across both the exhaust air channel B and the circulation channel C, unlike the configuration of the above-described embodiment, it is possible to perform, for example, only air supply, or only air exhaustion and the circulation of the indoor air, by controlling the on-off state of each impeller separately. In this case, even when air exhaustion and the circulation of the indoor air are not performed, it is possible to draw fresh air into the room by performing air supply.

In, for example, a configuration in which the first blowing portion 4 is provided in the circulation channel C and the second blowing portion 7 is provided so as to extend across both the supply air channel A and the exhaust air channel B, unlike the configuration of the above-described embodiment, it is also possible to perform only the circulation of the indoor air, or only air exhaustion and air supply, by controlling the on-off state of each impeller separately. In this case, even when air exhaustion and air supply are not performed, it is possible to perform air purification while suppressing a change in the indoor air temperature, by performing the circulation of the indoor air.

By permitting the separate on-off control of each impeller, the heat exchanger unit 1 can meet various specifications.

When controlling the operation of the impeller that performs air supply and the impeller that performs air exhaustion by separate fan motors as described above, it is possible to have measures against sick house syndrome and other improvements for the indoor environment more effectively by, for example, controlling the operation such that the volume of supply air exceeds that of exhaust air so as to prevent a negative pressure from occurring in the room.

[G]

In the above-described embodiment, a heat exchanger unit 1 including no particular air conditioning equipment in the supply air channel A is described as an example. However, the present invention is not limited to this, and may have a configuration in which an air conditioning portion having another air conditioning function different from the optical deodorization function of the optical deodorization portion U1 is provided in the supply air channel A. Alternatively, an air conditioning portion having the same function as the optical deodorization function may be provided. For example, the invention may be provided with the function of generating negative ions or the function of aromatizing the air to be air-conditioned, in addition to the above-described humidification/dehumidification function, deodorization function or the function of removing bacteria and viruses. Thus, even though the heat exchanger unit is provided with the heat exchange ventilation function, the optical deodorization function (or a different function) and another air conditioning function, it is possible to save space by forming two airflows with the above-described double-suction first impeller 5.

In the present modification [G], the rotation of the impellers may be controlled by two separate fan motors by providing a fan motor for rotating the first impeller 5 and a fan motor for rotating the second impeller 8 as described in the above-described modification [F]. In this case, the air conditioning portion that is additionally provided in the supply air channel A can also be on-off controlled separately.

In this case, it is possible to control the operation of the impellers as needed. For example, operating only one of the impellers or both impellers, by forming the channels such that the main three air conditioning functions, including the heat exchange ventilation by air supply and air exhaustion, the air conditioning portion in the supply air channel A and the optical deodorization portion U1 in the circulation channel C, are assigned to the first impeller 5 and the second impeller 8 according to the target specifications.

[H]

It is also possible to adopt a configuration that allows humidity control through dehumidification and humidification by disposing a desiccant made of zeolite or the like that has excellent moisture absorbing-desorbing properties such that it extends across both the exhaust air channel B and the supply air channel A. By adopting this configuration, it is possible to perform humidity control through dehumidification and humidification, in addition to heat exchange between the air of the supply air channel A and the air of the exhaust air channel B, giving a more comfortable indoor environment. For example, if dry air is needed to be drawn into the room, the moisture in the air flowing through the supply air channel A is absorbed in a portion of a disc-shaped moisture absorbing roller using zeolite, and this roller is rotated to move the portion that has absorbed moisture into the exhaust air channel B. Then, the portion that has absorbed moisture is passed through the exhaust air channel B while heating the air flowing through the channel. Accordingly, air with high moisture content is released to the outside and air with low moisture content is supplied into the room. The opposite of this can also be performed. By performing heat exchange ventilation in combination with moisture control in this manner, it is possible to achieve a more comfortable indoor environment. The same effect can also be achieved by arranging the above-described desiccant so as to extend across both the exhaust air channel B and the circulation channel C.

[I]

The heat exchanger unit 1 according to the above-described embodiment can be applied to a ceiling-embedded type device, such as one in which the supply air discharge outlet A2 and the exhaust air suction inlet B1 are formed in the ceiling of the room. The heat exchanger unit 1 of the above-described embodiment may be installed in combination with and driven in association with an air conditioning device and the like, or may be driven separately with the air conditioning device. It can also be applied to a heat exchange apparatus that is installed singularly in a room or the like where no air conditioning device is provided.

Second Embodiment

Figure 8:
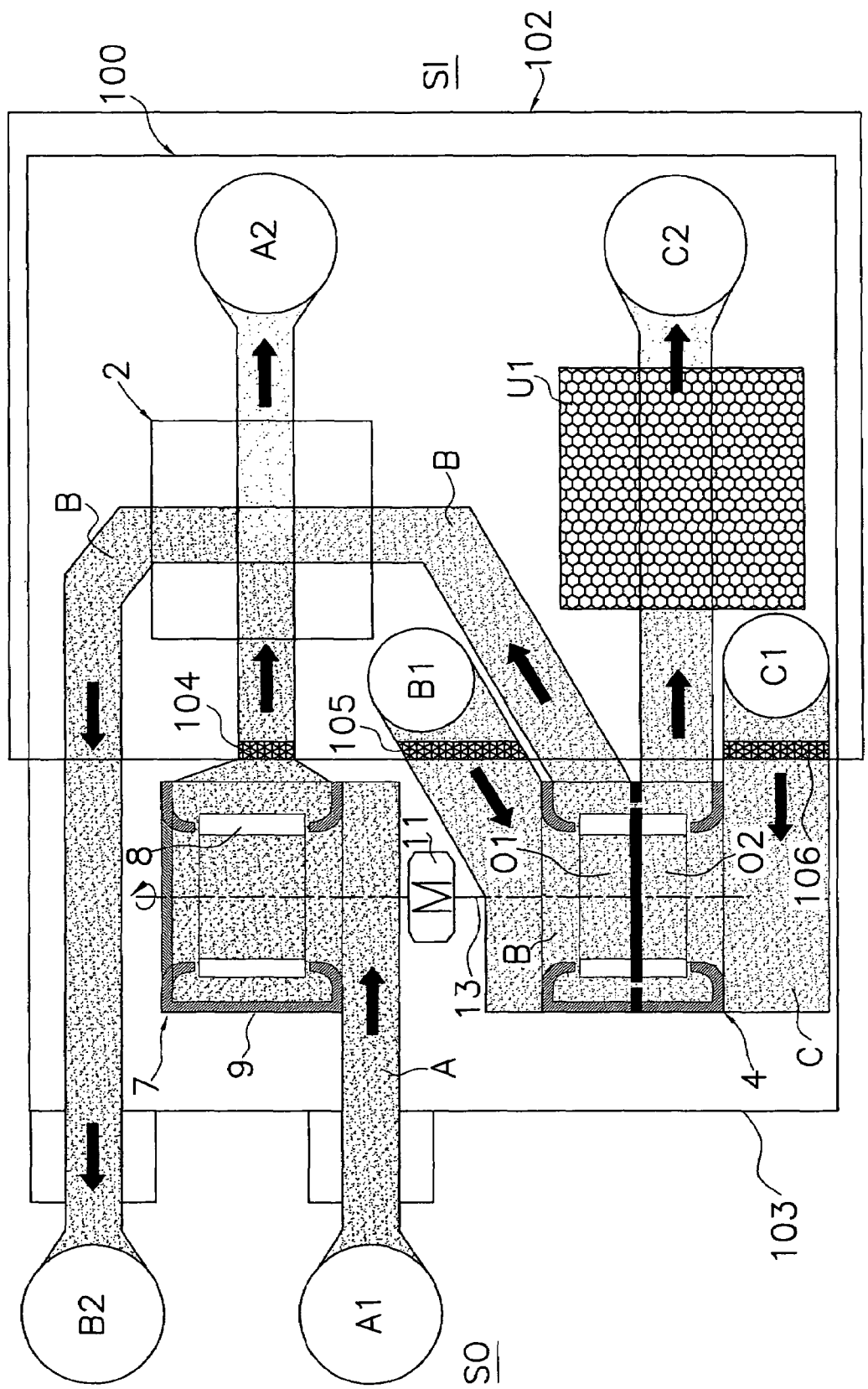
FIG. 8 is a cross-sectional conceptual view showing a configuration of a heat exchanger unit according to a second embodiment.

Here, a heat exchanger unit 100 according to a second embodiment shown in FIG. 8 is described. The heat exchanger unit 100 is different from the heat exchanger unit 1 according to the above-described first embodiment in the following respects. FIG. 8 is a cross-sectional conceptual view of the heat exchanger unit 100 through a plane that is in parallel with a plane of a ceiling or the like, when installed in a ceiling or the like in the room, and for a better understanding of the concept, channels are shown as ducts. However, it is also possible to form the channels by providing a partition plate in each portion, instead of by providing such ducts. For example, the heat exchanger unit 100 is installed such that a panel portion 102 and four openings A2, B1, C1, and C2 that are provided in the panel portion 102 can be viewed when looking up to the ceiling in the room. Here, the air of the outdoor space SO is drawn from the supply air suction inlet A1, then heat-exchanged by the heat exchange element 2, and released from the supply air discharge outlet A2 into the indoor space SI. The air of the indoor space SI is drawn from the exhaust air suction inlet B1, then heat-exchanged by the heat exchange element 2, and released from the exhaust air discharge outlet B2 into the outdoor space SO. Moreover, the air of the indoor space SI is drawn from the circulation suction inlet C1, then has odor reduced with the optical deodorization portion U1, and released from the circulation discharge outlet C2 into the indoor space SI again. In this second embodiment, the supplementary function portion U1 can also be any of the optical deodorization portion, the humidification portion, the air purification portion and the like.

In the above-described embodiment, the supply air channel A, the exhaust air channel B and the circulation channel C are not provided with an air filter that removes dust and the like from air. However, in the second embodiment, the supply air channel A, the exhaust air channel B and the circulation channel C are provided with such air filters 104, 105 and 106. Accordingly, the contamination in the outside air drawn into the indoor space SI can be reduced with the air filter 104 in the supply air channel A. The contamination in the air to be released into the outdoor space SO can also be reduced with the air filter 105 in the exhaust air channel B. Moreover, the contamination in the air drawn from the indoor space SI can be reduced with the air filter 106 in the circulation channel C, thereby decreasing the load applied to the optical deodorization portion U1.

In the above-described embodiment, the first blowing portion 4 is provided so as to extend across both the supply air channel A and the circulation channel C. However, it is also possible to employ a configuration in which the first blowing portion 4 is provided so as to extend across both the exhaust air channel B and the circulation channel C as in the heat exchanger unit 100 shown in FIG. 8. This heat exchanger unit 100 is configured such that, of the two divided spaces O1 and O2 in the first blowing portion 4, the space O1 is included in the exhaust air channel B and the space O2 is included in the circulation channel C.

In the above-described embodiment, the optical deodorization portion U1 as the supplementary function portion provided in the circulation channel C is provided between the circulation suction inlet C1 and the first blowing portion 4. However, it is possible to employ a configuration in which the supplementary function portion U1 is provided between the first blowing portion 4 and the circulation discharge outlet C2, as in the heat exchanger unit 100 shown in FIG. 8. That is, instead of a configuration in which the air of the indoor space SI is air-conditioned with the supplementary function portion U1 after it is drawn from the circulation suction inlet C1 and before it passes through the first blowing portion 4, it is possible to employ a configuration in which the air of the indoor space SI is air-conditioned with the supplementary function portion U1 after it passes through the first blowing portion 4 and immediately before it is released from the circulation discharge outlet C2 into the indoor space SI again. In this case, the condition of the air passing through in the vicinity of the devices such as the first blowing portion 4 can be made similar to that of the air of the indoor space SI passing through in the vicinity of the circulation discharge outlet C2. Accordingly, even when there is a possibility that the air that has been air-conditioned with the supplementary function portion U1 may cause deterioration of the devices such as the first blowing portion 4 owing to the properties of the supplementary function portion U1, it is possible to reduce such possibility of causing deterioration in the heat exchanger unit 100 according to the second embodiment.

For example, if the humidification portion is provided between the circulation suction inlet C1 and the first blowing portion 4 when the humidification portion is used as the supplementary function portion U1, humidified air containing moisture will pass through in the vicinity of the devices such as the first blowing portion 4, resulting in a possibility of causing deterioration of the devices such as the first blowing portion 4. In the heat exchanger unit 100 of the second embodiment, however, the supplementary function portion is provided between the first blowing portion 4 and the circulation discharge outlet C2, so that it is possible to suppress the humidified air containing moisture from passing through in the vicinity of the devices such as the first blowing portion 4, thus reducing the possibility of causing deterioration of the devices such as the first blowing portion 4.

In the heat exchanger unit 1 of the above-described embodiment, the flow directions of the two channels passing through the heat exchanger element 2 do not intersect with each other, as shown in FIG. 1. However, the flow directions of the two channels passing through the heat exchanger element 2 may be provided in a substantially orthogonal relationship with each other, as in the heat exchanger unit 100 shown in FIG. 8.

In the heat exchanger unit 1 of the above-described embodiment, the heat exchanger element 2 is provided such that the sides of the heat exchanger element 2 are substantially parallel with the corresponding diagonals of the heat exchanger casing 3 having a substantially quadrangular shape, as shown in FIG. 1. However, the heat exchanger element 2 may be provided such that the sides of the heat exchanger element 2 are substantially parallel with the corresponding sides of the heat exchanger casing 103 having a substantially quadrangular shape, as in the heat exchanger unit 100 of the second embodiment shown in FIG. 8. Accordingly, it is possible to readily house the heat exchanger element 2 in the heat exchanger casing 103, and also to achieve a greater space saving.

In the heat exchanger unit 1 of the above-described embodiment, a double-suction configuration is employed not only for the first blowing portion 4, but also for the second blowing portion 7a. However, a single-suction configuration may be employed for the second blowing portion 7, as in the heat exchanger unit 100 shown in FIG. 8. It is possible also in this case to achieve the same effect as that of the above-described embodiment.

Except for the above-described aspects, the configuration of the heat exchanger unit 100 is the same as that of the heat exchanger unit 1 of the above-described embodiment.

Modifications of Second Embodiment of the Present Invention

[A]

In the second embodiment described above, the first impeller 5 and the second impeller 8 are configured such that they are simultaneously rotated about the same shaft by the fan motor 11. Here, the first impeller 5 and the second impeller 8 can also be configured such that they have different numbers of revolution per unit time, for example, by varying the number of the teeth of the gears used for the impellers.

On the other hand, instead of controlling the rotation of the two impellers by a single fan motor 11 as in the above-described embodiment, the rotation of the impellers may be separately controlled by two fan motors, for example, by separately providing a fan motor for rotating the first impeller 5 and a fan motor for rotating the second impeller 8. This permits separate and independent on-off control of each impeller. Other aspects can be achieved in the same way as in the modification (F) of the heat exchanger unit of the above-described first embodiment.

When controlling the operation of the impeller that performs air supply and the impeller that performs air exhaustion by separate fan motors as described above, it is possible to achieve measures against sick house syndrome and other improvements for the indoor environment more effectively by, for example, controlling the operation such that the volume of supply air exceeds that of exhaust air so as to prevent a negative pressure from occurring in the room.

[B]

In the heat exchanger unit 100 of the above-described second embodiment, the air filter 104 is provided as the air conditioning function in the supply air channel A, and the contamination in the outside air to be drawn into the indoor space SI is reduced. However, the present invention is not limited to this, and may have a configuration in which an air conditioning portion having another air conditioning function different from the optical deodorization function of the optical deodorization portion U1 is provided in the supply air channel A. Alternatively, an air conditioning portion having the same function as the optical deodorization function may be provided. For example, the invention may be provided with the function of generating negative ions or the function of aromatizing the air to be air-conditioned, in addition to the above-described humidification/dehumidification function, deodorization function or the function of removing bacteria and viruses. Thus, even though the heat exchanger unit is provided with the heat exchange ventilation function, the optical deodorization function (or a different function) and another air conditioning function, it is possible to save space by forming two airflows with the above-described double-suction first impeller 5.

Also in the present modification [B], the rotation of the impellers may be controlled by two separate fan motors by separately providing a fan motor for rotating the first impeller 5 and a fan motor for rotating the second impeller 8, as described in the above-described modification A. In this case, the air conditioning portion that is additionally provided in the supply air channel A can also be on-off controlled separately.

In addition, it is possible to perform, for example, only air supply, or only air exhaustion and the circulation of the indoor air, by controlling the on-off state of each impeller separately. In this case, even when air exhaustion and the circulation of the indoor air are not performed, it is possible to draw fresh air into the room by performing air supply, while introducing fresh air that has been air-conditioned by operating the air conditioning portion provided in the supply air channel A.

It should be noted that each of the modifications of the heat exchanger unit according to the above-described first embodiment can be applied to this second embodiment.

INDUSTRIAL APPLICABILITY

With the use of the heat exchanger unit according to the present invention, it is possible with a single impeller to produce airflows in two channels, including a channel for the air sucked from one suction inlet side and a channel for the air sucked from the other suction inlet side, thus saving space even for a heat exchanger unit provided with a supplementary function.

What is claimed is:

1. A heat exchanger unit comprising:

a supply air channel flowing from an outdoor space to an indoor space;

an exhaust air channel flowing from the indoor space to the outdoor space exchanging heat with the supply air channel;

a first blowing portion including a double-suction first impeller that produces an airflow and a first casing that houses the double-suction first impeller, the double-suction first impeller including a first suction inlet, a second suction inlet and a first impeller side-partition member that divides an interior of the first impeller into a first space at a first suction inlet side of the double-suction first impeller and a second space at a second suction inlet side of the double-suction first impeller, and the first casing including a first casing side-partition member extending from an inner circumference of the first casing to a vicinity of an outer circumference of the first impeller side-partition member;

a first air channel connecting the indoor space to the first suction inlet side of the double-suction first impeller;

a second air channel guiding air flow from the double-suction first impeller to the indoor space; and at least one air conditioning element disposed in at least one of the first air channel and the second air channel to condition air supplied to the indoor space, the at least one air conditioning element including at least one selected from a deodorization element that reduces odorous components in passing air, an air purification element that reduces harmful components in passing air and a humidification element that increases moisture in passing air, a part of one of the supply air channel and the exhaust air channel connecting the second suction inlet side of the double-suction first impeller to the indoor space.

2. The heat exchanger unit according to claim 1, wherein the first impeller side-partition member and the first casing side-partition member are freely positionable in the direction of a rotation shaft of the first impeller.

3. The heat exchanger unit according to claim 1, wherein the first impeller includes a pair of annular members and a plurality of blades disposed on a circumference so as to join the annular members together.

4. The heat exchanger unit according to claim 1, wherein the first air channel draws air of the indoor space to the first suction inlet and the second air channel returns the air from the first suction inlet side of the double-suction first impeller into the indoor space.

5. The heat exchanger unit according to claim 1, further comprising
a second blowing portion including a second impeller sharing a rotation shaft with the first impeller.

6. The heat exchanger unit according to claim 5, wherein the second impeller is a double-suction impeller device having an additional first suction inlet and an additional second suction inlet, and the heat exchanger further comprises:
at least one additional air conditioning element arranged to condition air supplied to the indoor space by the double-suction second impeller, the at least one additional air conditioning element including at least one selected from a deodorization element that reduces odorous components in passing air, an air purification element that reduces harmful components in passing air and a humidification element that increases moisture in passing air.

7. The heat exchanger unit according to claim 6, wherein the second blowing portion further includes a second casing that houses the double-suction second impeller with an interior of the second casing being divided into a third space at an additional first suction inlet side of the double-suction second impeller and a fourth space at an additional second suction inlet side of the double-suction second impeller.

8. The heat exchanger unit according to claim 1, further comprising
a second blowing portion including a second casing that houses a second impeller that produces an air flow, the second impeller sharing a rotation shaft with the first impeller.

9. The heat exchanger unit according to claim 8, wherein the second impeller is a double-suction impeller that includes a third suction inlet, a fourth suction inlet and a second impeller side-partition member that divides an interior of the second impeller into a third space at a third suction inlet side of the double-suction second impeller and a fourth space at a fourth suction inlet side of the double-suction second impeller, and the second casing includes a second casing side-partition member extending from an inner circumference of the second casing to a vicinity of an outer circumference of the second impeller side-partition member, and the heat exchanger unit further comprises
a third air channel connecting the indoor space to the third suction inlet side of the double-suction second impeller;
a fourth air channel guiding air flow from the double-suction second impeller to the indoor space; space with the third and fourth air channels together forming a circulation channel; and
at least one additional air conditioning element disposed in the circulation channel to condition air supplied to the indoor space, the at least one additional air conditioning element including at least one selected from a deodorization element that reduces odorous components in passing air, an air purification element that reduces harmful components in passing air and a humidification element that increases moisture in passing air.

* * * * *